United States Patent
Lefebvre et al.

(10) Patent No.: US 11,859,503 B1
(45) Date of Patent: Jan. 2, 2024

(54) PROBE HEAT SHIELDING

(71) Applicant: PRATT & WHITNEY CANADA CORP., Longueuil (CA)

(72) Inventors: Guy Lefebvre, St-Bruno-de-Montarville (CA); Jacob Biernat, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/809,952

(22) Filed: Jun. 30, 2022

(51) Int. Cl.
*F01D 21/00* (2006.01)
*F01D 17/02* (2006.01)
*F01D 25/28* (2006.01)
*F01D 25/30* (2006.01)

(52) U.S. Cl.
CPC ........... *F01D 21/003* (2013.01); *F01D 17/02* (2013.01); *F01D 25/28* (2013.01); *F01D 25/285* (2013.01); *F01D 25/30* (2013.01); *F05D 2220/323* (2013.01); *F05D 2240/55* (2013.01); *F05D 2260/231* (2013.01); *F05D 2270/80* (2013.01)

(58) Field of Classification Search
CPC ........ F01D 21/003; F01D 17/02; F01D 25/28; F01D 25/285; F01D 25/30; F05D 2220/323; F05D 2240/55; F05D 2260/231; F05D 2270/80
See application file for complete search history.

(56) References Cited

U.S. PATENT DOCUMENTS

| | | | |
|---|---|---|---|
| 2,877,860 A | 3/1959 | Hoffar | |
| 2,979,151 A | 4/1961 | Blackwell et al. | |
| 2,999,388 A | 9/1961 | Herron, Jr. | |
| 3,520,133 A | 7/1970 | Loft et al. | |
| 3,990,308 A | 11/1976 | McCormick et al. | |
| 4,091,653 A * | 5/1978 | Lee .......................... | G01F 25/10 73/1.28 |
| 4,580,910 A | 4/1986 | Corwin | |
| 4,597,675 A | 7/1986 | Maertins et al. | |
| 5,230,214 A | 7/1993 | Pechette | |
| 5,404,760 A | 4/1995 | Robinson et al. | |
| 7,328,623 B2 | 2/2008 | Slagle et al. | |
| 9,551,281 B2 | 1/2017 | Lefebvre et al. | |
| 9,880,059 B2 | 1/2018 | Myers et al. | |
| 10,393,027 B2 | 8/2019 | Lefebvre et al. | |
| 10,876,426 B2 | 12/2020 | Smith | |
| 11,339,679 B1 * | 5/2022 | Lefebvre .................. | F02C 7/00 |
| 2002/0029557 A1 | 3/2002 | Tobo et al. | |

(Continued)

FOREIGN PATENT DOCUMENTS

| | | |
|---|---|---|
| EP | 3043056 A2 | 7/2016 |
| EP | 3361057 A2 | 8/2018 |
| EP | 3453841 A1 | 3/2019 |

OTHER PUBLICATIONS

European Search Report issued in counterpart application 22156448.7 dated Jul. 19, 2022.

*Primary Examiner* — Hoang M Nguyen
(74) *Attorney, Agent, or Firm* — NORTON ROSE FULBRIGHT CANADA LLP.

(57) ABSTRACT

A probe shielding arrangement comprises a sleeve having a radially inner end mounted to a turbine housing and a radially outer end floatingly received in a probe boss on an exhaust case. The sleeve circumscribes an annular cavity around the probe. The annular cavity is sealed at opposed ends thereof to form a dead air cavity around the probe for insulation purposes.

16 Claims, 3 Drawing Sheets

(56) References Cited

U.S. PATENT DOCUMENTS

| | | |
|---|---|---|
| 2006/0053802 A1 | 3/2006 | Sasao et al. |
| 2007/0256404 A1 | 11/2007 | Lefebvre et al. |
| 2012/0247108 A1 | 10/2012 | Romig et al. |
| 2014/0186168 A1* | 7/2014 | Chuong ................ F01D 21/003 415/182.1 |
| 2014/0331658 A1 | 11/2014 | Adupala et al. |
| 2016/0356174 A1 | 12/2016 | Myers et al. |
| 2020/0088606 A1 | 3/2020 | Warren et al. |
| 2020/0300810 A1 | 9/2020 | Liu et al. |
| 2022/0243615 A1* | 8/2022 | Turcotte ................... F02C 7/24 |

\* cited by examiner

PROBE HEAT SHIELDING

TECHNICAL FIELD

The application relates generally to aircraft engines and, more particularly, to a thermal protection for a probe disposed in a hot section of the engine.

BACKGROUND OF THE ART

Aircraft engines, such as gas turbine engines, include sections at low temperatures, namely cold section modules, and sections at high temperatures, namely hot section modules. The cold section modules include for example the compressor, while the hot section modules include for example, the combustor and the turbine. While some mechanical components may sustain the high temperatures prevailing in the hot section modules, other components, such as probes, may benefit from thermal protection.

SUMMARY

In one aspect, there is provided a gas turbine engine hot section comprising: a turbine housing extending around a central axis and having a first probe boss; an exhaust case surrounding the turbine housing and having a second probe boss aligned with the first probe boss on the turbine housing, a cavity radially between the turbine housing and the exhaust case; a probe extending through the second probe boss, the cavity and the first probe boss; and a sleeve extending from the first probe boss through the cavity and into the second probe boss, the sleeve circumscribing an annular cavity around the probe, the annular cavity being sealed at opposed radially inner and radially outer ends thereof to form a dead air cavity around the probe.

In another aspect, there is provided an aircraft power plant comprising: a nacelle; a gas turbine engine mounted in the nacelle, the gas turbine engine comprising: a compressor; a turbine drivingly connected to the compressor, the turbine housed in a turbine housing extending around a central axis, the turbine housing having a first probe boss; an exhaust case for discharging combustion gases received from the turbine, the exhaust case surrounding the turbine housing and having a second probe boss aligned with the first probe boss; a probe extending through the first and second probe bosses and into the turbine housing; and a sleeve projecting from the first probe boss into the second probe boss, the sleeve circumscribing an annular cavity around the probe, the annular cavity closed at both a radially outer end and a radially inner end thereof.

In a further aspect, there is provided a thermal shielding arrangement for a probe extending through an exhaust case and a turbine housing of an aircraft engine, the thermal shielding arrangement comprising: a sleeve having a radially inner end mounted with a tight fit engagement to the turbine housing and a radially outer end floatingly received in a probe boss on the exhaust case, the sleeve circumscribing an annular cavity around the probe, the annular cavity being closed at opposed ends thereof.

DESCRIPTION OF THE DRAWINGS

Reference is now made to the accompanying figures in which.

DETAILED DESCRIPTION

Figure 1:
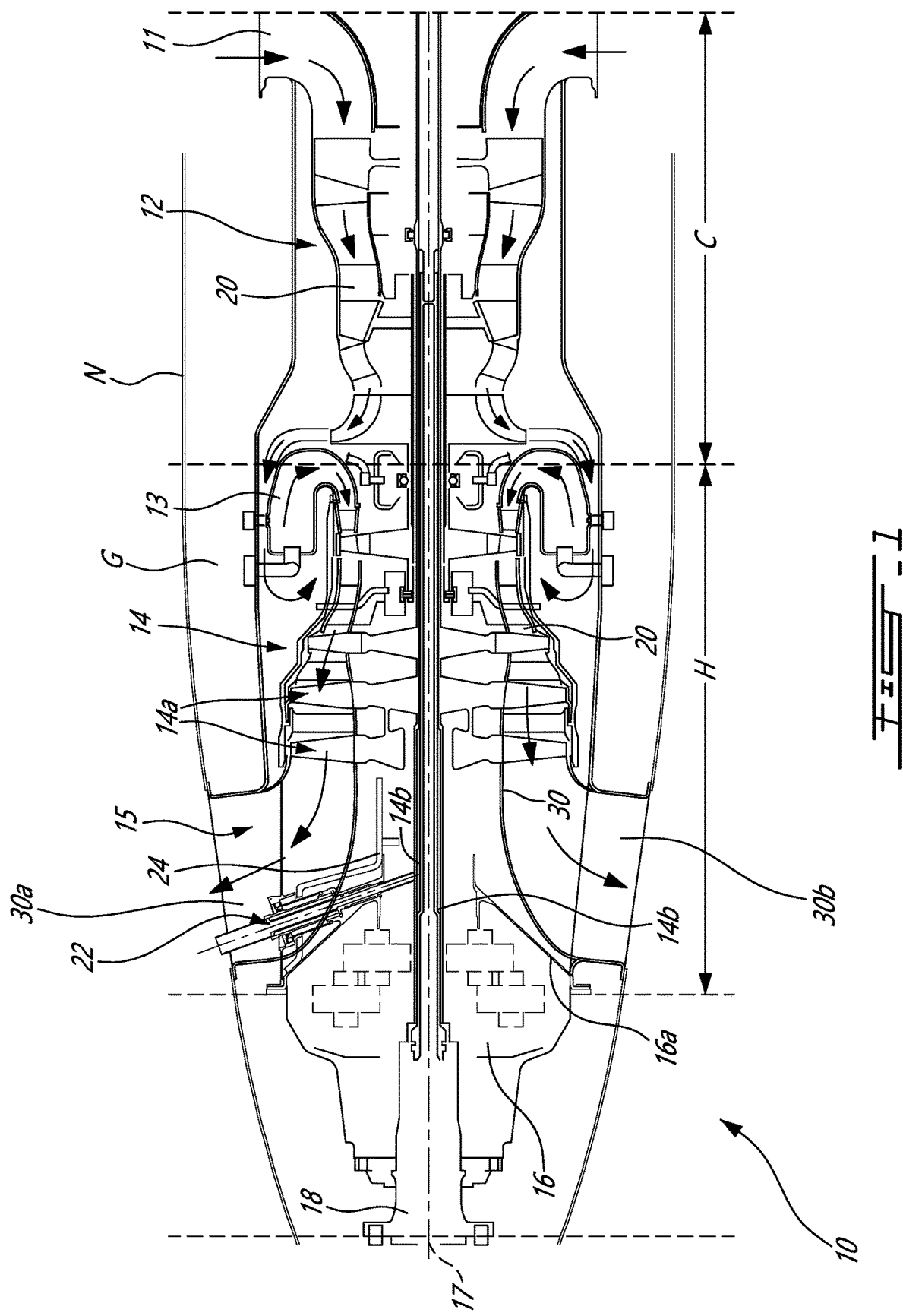
FIG. 1 is a schematic longitudinal/axial cross-section view of an exemplary boosted reverse flow gas turbine engine having a thermally shielded turbine probe.

FIG. 1 illustrates an aircraft power plant comprising a nacelle N housing a gas turbine engine 10 of a type preferably provided for use in subsonic flight, and generally comprising in serial flow communication an air inlet 11, a compressor 12 for pressurizing the air from the air inlet 11, a combustor 13 in which the compressed air is mixed with fuel and ignited for generating an annular stream of hot combustion gases, a turbine 14 for extracting energy from the combustion gases, and an exhaust case 15 through which the combustion gases exit the engine 10. The turbine 14 includes a low pressure (LP) or power turbine 14a drivingly connected to an input end of a fully enclosed reduction gearbox (RGB) 16. The RGB 16 has an output end drivingly connected to an output shaft 18 configured to drive a rotatable load (not shown). For instance, the rotatable load can take the form of a propeller or a rotor, such as a helicopter main rotor. The gas turbine engine 10 has an engine centerline 17. According to the illustrated embodiment, the compressor and the turbine rotors are mounted in-line for rotation about the engine centerline 17.

The gas turbine engine 10 has an axially extending central core which defines an annular gaspath 20 through which gases flow, as depicted by flow arrows in FIG. 1. The exemplary embodiment shown in FIG. 1 is a "reverse-flow" engine because gases flow through the gaspath 20 from the air inlet 11 at a rear portion thereof, to the exhaust case 15 at a front portion thereof. According to one aspect, the engine 10 can have an engine architecture corresponding to that of the engine described in applicant's U.S. Pat. No. 10,393,027 issued on Aug. 27, 2019, the entire content of which is herein incorporated by reference. While the engine 10 is exemplified as a reverse flow engine, it is understood that the engine could be embodied as a through-flow engine.

As shown in FIG. 1, the exhaust case 15 may comprise an asymmetric dual port exhaust duct 30 for exhausting combustion gases received from the last stage of the LP turbine 14a on opposed sides of the engine 10. The dual port exhaust duct 30 is qualified as "asymmetric" because the two exhaust ports thereof are not coaxial to the engine centerline 17 (i.e. the exhaust flow discharged from the exhaust duct is not axial, it is rather discharged in a direction that diverges from the engine centerline 17). According to at least some embodiments, the dual port exhaust duct 30 has a generally "Y-shaped" annular body including an annular central inlet conduit portion extending axially around the engine centerline 17 for receiving the annular flow of combustions gases discharged from the last stage of LP turbine 14a, and first and second diverging outlet conduit portions 30b, 30c branching off laterally from the central inlet conduit portion. According to some embodiments, the first and second outlet conduit portions 30b, 30c are identical.

Still referring to FIG. 1, it can be seen that the turbine 14 comprises a power or LP turbine housing 24 mounted to and extending axially from the RGB 16 centrally into the hollow center of the annular exhaust duct 30. The LP turbine housing 24 is configured to receive a bearing (not shown) for supporting the LP turbine rotor(s). During assembly, the exhaust duct 30 is axially slid in position over the LP turbine housing 24. Once the exhaust duct 30 has been properly positioned over the LP turbine housing 24, the two are detachably secured to the RGB 16 such as by bolting at a front flange interface.

Still referring to FIG. 1, it can be seen that the engine 10 has a cold section C. The cold section C includes the air inlet 11 and the compressor 12. The engine 10 also has a hot section H, which in use, is subject to high temperatures. The hot section H includes the combustor 13, the turbine 14 and the exhaust case 15. For instance, the temperatures inside the turbine 14 are typically in excess of 1000 degree. C. In use, the continuous flow of gas to which the turbine 14 is exposed can be at temperatures up to 1700 degree. C.

Figure 2:
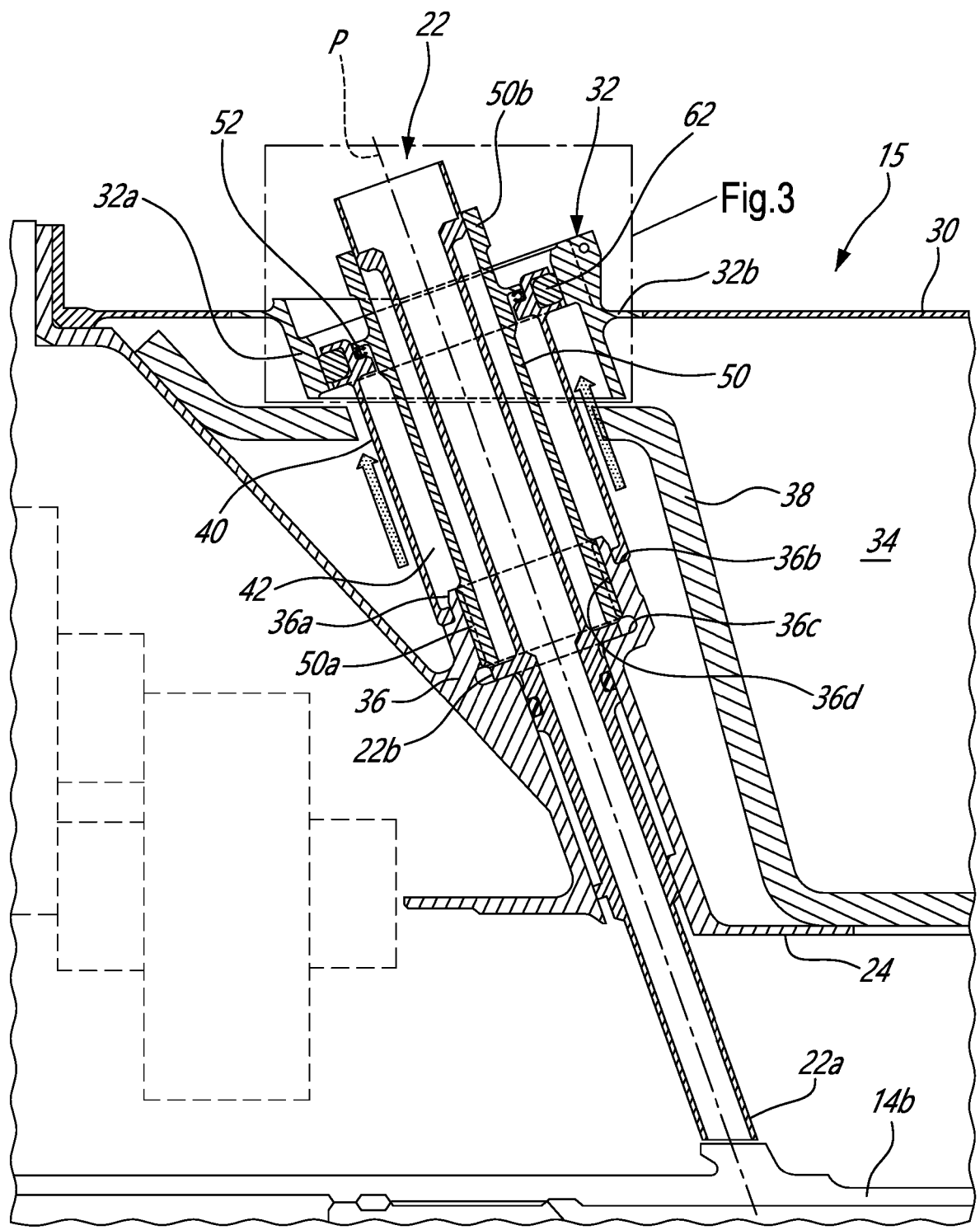
FIG. 2 is an enlarged cross-section view illustrating a heat shield sleeve extending around the turbine probe in a cavity between an exhaust case and a power turbine housing of the engine shown in FIG. 1.
Figure 3:
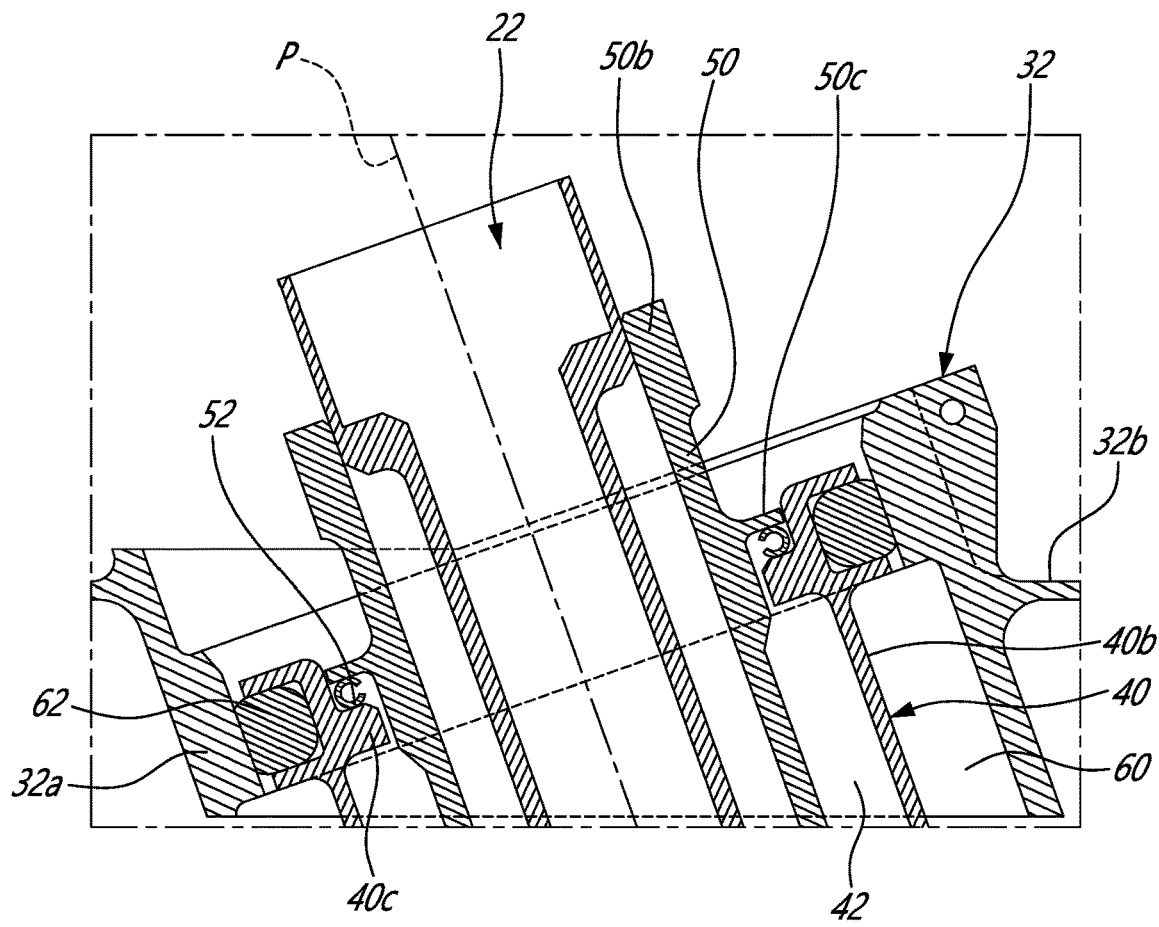
FIG. 3 is a further enlarged cross-section view illustrating assembly details at a radially outer end of the heat shield sleeve.

The engine 10 is equipped with a plurality of probes (sensors) for measuring various operating parameters, such as torque, speed, distance, temperature, pressure etc. Some of these probes are disposed in the hot section H of the engine 10. Accordingly, these probes need to be able to cope with the high temperatures prevailing in the hot section H of the engine 10. It may thus be desirable to thermally shield the probes in order to maintain the temperature of the probes within acceptable limits. FIGS. 1-3 illustrate an example of such a thermally shielded probe. More particularly, FIGS. 1-3 illustrate a probe 22 projecting through the exhaust case 15 and the LP turbine housing 24 to a location where a tip 22a of the probe 22 is positioned adjacent to the LP turbine shaft 14b for measuring an operating parameter (e.g. speed and/or torque) of the LP turbine 14a.

The exemplary probe 22 extends through a probe boss 32 mounted in a receiving hole defined at the top dead center of the exhaust duct 30 between the two diverging outlet conduit portions 30b, 30c thereof. The term "boss" is herein intended to generally refer to a mounting feature on a work piece. For instance, it can take the form of a protruding feature used to locate one component (e.g. a probe) within a pocket or hole of another component (e.g. the exhaust duct). As exemplified in FIGS. 2-3, the probe boss 32 may be provided in the form of a cylindrical sleeve 32a cast with an outer flange 32b welded or otherwise suitably secured to the exhaust duct 30. According to some embodiments, the sleeve 32a has a slanted tubular portion that projects inwardly into the exhaust duct 30 in a "dead" air cavity 34 radially between the LP turbine housing 24 and the exhaust duct 30. The slanted tubular portion is aligned with an associated probe boss 36 provided on the turbine housing 24. The probe bosses 32, 36 extend centrally around a common probe axis P. Such axially aligned probe bosses 32, 36 provide a passage for the probe 22 through the exhaust case 15 and the turbine housing 24. As shown in FIG. 2, the probe 22 extends through the registering probe bosses 32, 36 and into the LP turbine housing 24 next to the LP turbine shaft 14b. The tip portion 22a of the probe 22 is thermally shielded by the oil contained in the LP turbine housing 24. However, the upper portion of the probe 22 in the cavity 34 between the exhaust duct 30 and the turbine housing 24 does not benefit from the heat shielding action of the oil in the turbine housing 24. Accordingly, a probe heat shield is provided in the cavity 34 to protect the upper portion of the probe 22 from heat radiations emanating from the exhaust duct 30. As will be seen hereinafter, the probe heat shield is configured to create a heat shielding volume around the probe 22 along a radial extent of the cavity 34 between the exhaust duct 30 and the LP turbine housing 24 while allowing for the assembly of the exhaust duct 30 over the LP turbine housing 24.

As shown in FIG. 2, the probe heat shield may include a thermal blanket 38 mounted to a radially outer surface of the turbine housing 24 so as to cap or surround the probe boss 36. The thermal blanket 38 can include a thermal insulation core (e.g. high temperature insulation fiber/wool materials) encapsulated in a metallic skin (e.g. sheet metal or metallic foil). The thermal blanket 38 forms a protective enclosure around a first portion of the length the probe projecting radially outwardly from the LP turbine probe boss 36. However, as shown in FIG. 2, the protective enclosure formed by the thermal blanket 38 on the LP turbine housing 24 only radially extends along a portion of the cavity 34. Indeed, the radially outer end of the thermal blanket 38 through which the probe 22 extends is spaced radially inwardly from the inner end of the probe boss 32 on the exhaust duct 30 so as to permit axial assembly of the exhaust duct 30 over the LP turbine housing 24 along the engine centerline 17.

To further thermally shield the probe 22 from heat radiation in the cavity 34, the heat shield further comprises a sleeve 40, which bridges the space between the LP turbine housing 24 and the exhaust case 15. As will be seen hereinafter, the sleeve 40 cooperates with sealing features and adjoining structures to create an annular "dead" air cavity 42 around the probe 22.

Figure 4:
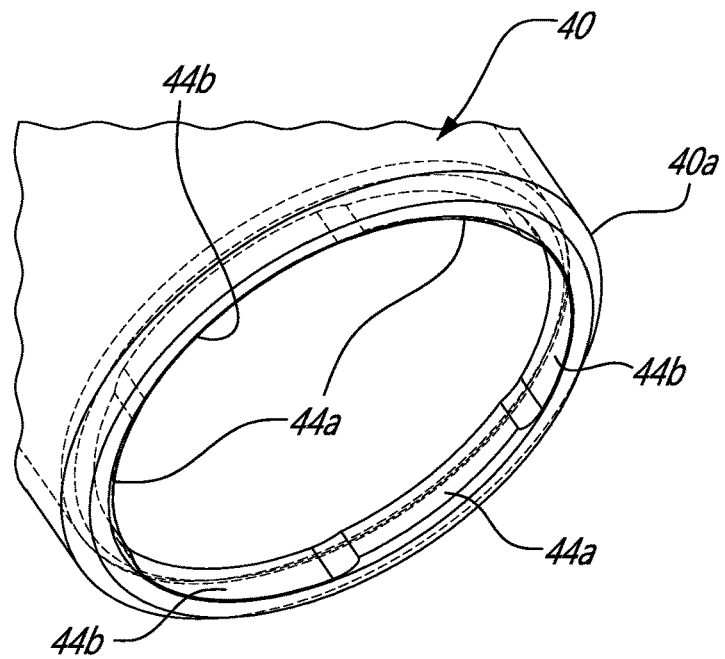
FIG. 4 is an enlarged view of a radially inner end of the heat shield sleeve and illustrating circumferentially spaced-apart tight fit contact surface segments spaced by inter-slot segments.

Referring to FIGS. 2 and 4, it can be appreciated that the sleeve 40 has a radially inner end 40a fixedly mounted to the turbine housing 24. More particularly, the radially inner end 40a of the sleeve 40 is assembled on the probe boss 36 with a tight fit (also know as an interference fit). The radially inner end 40a of the sleeve 40 has an inner diameter surface sized for a tight fit engagement with a corresponding outer diameter surface 36a at a radially outer distal end of the probe boss 36. As shown in FIG. 4, the inner diameter surface of the sleeve 40 may include circumferentially spaced-apart tight fit contact surface segments 44a spaced by inter-segment slots 44b to provide a circumferentially discontinuous tight fit engagement of the sleeve 40 on the outer diameter surface 36a of the probe boss 36. Such a discontinuous or interrupted tight fit interface between the sleeve 40 and the probe boss 36 may be used to facilitate assembly and dis-assembly by reducing the assembly/dis-assembly loads required to assemble or dis-assemble the sleeve 40. The sleeve assembly may be further facilitated by thermally expanding the sleeve 40 prior to the sleeve 40 being engaged over the probe boss 36. Once in position, the sleeve 40 is allowed to cool down to create the interference fit with the probe boss 36. According to such embodiments, the material of the sleeve 40 is selected to have substantially the same coefficient of thermal expansion as that of the probe boss 36 of the LP turbine housing 24 to preserve the integrity of the interference fit during engine operation. For instance, the LP turbine housing 24 and the sleeve 40 could be made from a nickel-based superalloy (e.g. Inconel 625).

According to the embodiment illustrated in FIG. 4, the inner diameter surface of the sleeve 40 has three tight fit contact surface segments 44a and three inter-segment slots 44b. However, it is understood that the number of tight fit contact surface segments 44a and, thus, of inter-segment slots 44b can vary. For instance, only two tight fit contact surface segments 44a could be provided. According to still further variants, the sleeve 40 could include more than three tight fit contact surface segments 44a. According to the illustrated embodiment, the tight fit contact surface segments 44a and the inter-segments slots 44b have a same circumferential length. However, it is understood that the circumferential length of the tight fit contact surface segments 44a could be different from that of the inter-segment slots 44b. Still referring to FIG. 4, it can be further appreciated that the tight fit contact surface segments 44a are equally circumferentially distributed around the radially inner end of the sleeve 40 to provide for a uniform circumferential engagement of the sleeve 40 on the probe boss 36. According to some embodiments, the inter-segment slots 44b may be milled or otherwise suitably formed in the inner diameter surface of the radially inner end of the sleeve 40. Alternatively, the tight fit contact surface segments 44a could be formed by additive manufacturing or other suitable manufacturing processes.

Referring back to FIG. 2, it can be appreciated that the probe boss 36 has an annular outer shoulder 36b projecting from the outer diameter surface 36a. The outer shoulder 36b provides an abutting surface (normal to the axis P) against which the radially inner end surface of the sleeve 40 is pushed in sealing abutment at assembly. In this way, the radially inner end 40a of the sleeve 40 can be sealingly assembled onto the probe boss 36 even though the tight fit interface between the sleeve 40 and the probe boss 36 is not circumferentially continuous. Such a mounting arrangement of the sleeve 40 on the probe boss 36 allows to substantially sealingly close the radially inner end of the annular cavity 42, thereby preventing hot air circulation therethrough.

Still referring to FIG. 2, the probe boss 36 further comprises an annular inner shoulder 36c for engagement with a corresponding annular outer shoulder 22b on the probe 22. The probe 22 is releasably secured in position against shoulder 36c by a hollow bolt 50 threadably engageable with the probe boss 36. As shown in FIG. 2, the hollow bolt 50 is adapted to be slidably fitted over the upper end portion of the probe 22 and is provided at a distal end with outer threads 50a for meshing engagement with corresponding inner threads 36d formed in an inner diameter surface of the probe boss 36 above the shoulder 36c. The hollow bolt 50 may have a hexagonal head 50b opposite its externally threaded end portion for facilitating tightening of the bolt 50 into the probe boss 36.

Referring jointly to FIGS. 2 and 3, it can be appreciated that the hollow bolt 50 has an annular outer shoulder 50c at an upper end thereof axially adjacent to the hexagonal head 50b. The shoulder 50c is configured to axially compress a resilient or compressible-type seal, such as the exemplified C-ring seal 52 (herein after C-seal 52), against an annular inner shoulder 40c projecting from an inner diameter surface of a radially outer end 40b of the sleeve 40. The C-seal 52 serves the dual purpose of: 1) sealing the radially outer end of the dead air cavity 42 and 2) urging/biasing the sleeve 40 in sealing contact against the outer shoulder 36b on the probe boss 36 while accommodating thermal growth of the sleeve 40 during engine operation. The sleeve 40 is thus axially clamped between the outer shoulder 50c of the bolt 50 and the outer shoulder 36b of the probe boss 36 with a spring-loaded action provided by the C-seal 52. The C-seal clamping assembly may be configured such that the C-seal 52 is compressed (and thus axially loads the sleeve 40) at cold assembly condition (i.e. when the sleeve 40 is not subject to thermal growth).

From the foregoing, it can be appreciated that the annular cavity 42 between the sleeve 40 and the hollow bolt 50 of the probe 22 is closed at both its radially inner and radially outer ends. The annular cavity 42 is thus a "dead" air cavity that operates as thermal insulation around the probe 22. That is a cavity in which there is no air circulation. A pressure delta may also be used to prevent fluid flow (e.g. hot air) from entering the dead air cavity 42. The compressible seal (e.g. the C-seal 52) at the radially outer end of the sleeve 40 allows to accommodate the thermal expansion of the sleeve 40 relative to the bolt 50 as schematically depicted by arrows A in FIG. 2 while preserving the integrity of the dead air cavity 42.

It can be appreciated from FIG. 2 that the sleeve 40 extends radially into the space thermally shielded by the thermal blanket 38 around the probe boss 36. The radially outer end 40b of the sleeve 40 is floatingly/movably received in the second probe boss 32 (i.e. the probe boss on the exhaust duct 30) for relative movement with respect thereto in response to thermal growth. As best shown in FIG. 3, the radially outer end 40b of the sleeve 40 is spaced from a surrounding inner surface of the probe boss 32 by an annular control gap 60. A compressible seal, such as a rope seal 62, extends across the annular control gap 60. The rope seal 62 may be removably mounted in an annular groove or any suitable seat defined in an outer diameter surface of the radially outer end 40b of the sleeve 40. The rope seal 62 is made out of a compressible material to provide sealing as well as damping between the sleeve 40 and the probe boss 32 of the exhaust case 15. More particularly, the rope seal 62 prevents hot air leakage from cavity 34 into the air cavity G while limiting the transmission of vibrations between the sleeve 40 and the probe boss 32. In addition, the rope seal 62 prevents water or sand/dirt particles from being ingested from cavity G into cavity 34.

The sleeve 40 is installed in position after the exhaust case 15 and the turbine housing 24 have been assembled together. The sleeve 40 is first thermally expanded and then installed over the first probe boss 36 via the second probe boss 32. The sleeve 40 is pushed axially along axis P so as to sealingly abut the annular end face at the radially inner end 40a of the sleeve 40 against the outer shoulder 36b of the probe boss 36. Then, the sleeve 40 is allowed to cool down to cause the tight fit contact surface segments 44a on the inner diameter surface of the sleeve 40 to contract against the outer diameter surface 36a of the probe boss 36, thereby providing for an interference fit between the sleeve 40 and the probe boss 36. The so created interference fit secures the sleeve 40 on the turbine housing 24. The rope seal 62 is typically installed on the sleeve 40 prior to the sleeve 40 being inserted through the probe boss 32.

Then, the probe 22 is inserted through the probe bosses 32, 36 and pushed axially in position so as to abut the probe outer shoulder 22b against the corresponding inner shoulder 36c of the probe boss 36. Prior or after inserting the probe 22, the C-seal 52 or an equivalent compression seal thereof is seated on the inner shoulder 40c at the radially outer end 40b of the sleeve 40. Thereafter, the hollow bolt 50 is fitted over the probe 22 and tightened to the probe boss 36 in order to secure the probe 22 in position and to apply a clamping load against the sleeve 40 via the bolt outer shoulder 50c and the C-seal 52. The compression of the C-seal 52 between the sleeve 40 and the hollow bolt 50 allows to seal the radially outer end of the annular dead air cavity 42. The radially inner end of the cavity 42 is sealed via the engagement of the end face of the radially inner end 40a of the sleeve 40 and the opposing surface of the outer shoulder 36b on the probe boss 36. The biasing action of the C-seal 52 on the sleeve 40 contributes to ensure proper sealing contact between the radially inner end 40a of the sleeve 40 and the outer shoulder 36b of the probe boss 36. It can be appreciated that the cavity 42 is closed at both ends thereof, thereby avoiding air recirculation or debris ingestion. The mounting arrangement thus provides for the creation of a dead air cavity as a means for thermally shielding the probe 22 from the heat radiated into the cavity 34 between the exhaust duct 30 and the turbine housing 24 during engine operation. The sleeve mounting arrangement provides a simple solution to thermally protect the probe 22 from heat radiation emanating from the exhaust duct 30.

To remove the sleeve 40, the bolt 50 is first untightened and removed. Thereafter, the probe 22 is removed. Then, a suitable tool, such as a puller (not shown), is used to grab the sleeve 40 by its inner shoulder 40c to pull the sleeve 40 out of engagement from the first probe boss 36. The inner shoulder 40c thus serves as a sealing surface and a pulling feature to remove the sleeve 40 when need be.

The above description is meant to be exemplary only, and one skilled in the art will recognize that changes may be made to the embodiments described without departing from the scope of the invention disclosed. For instance, while the probe installation has been described in the context of a turboprop/turboshaft engine architecture, it is understood that it could be applied to other engines, including turbofan and auxiliary power unit (APU) engines. Also, while the exemplified probe is installed on the power turbine housing, it is understood that it could be installed on other structures of the hot section of an engine. Also, it is understood that the present disclosure is not limited to a specific type of probe, such as speed and torque probes. Other modifications which fall within the scope of the present invention will be apparent to those skilled in the art, in light of a review of this disclosure, and such modifications are intended to fall within the appended claims.

The invention claimed is:

1. A gas turbine engine hot section comprising:
a turbine housing extending around a central axis and having a first probe boss;
an exhaust case surrounding the turbine housing and having a second probe boss aligned with the first probe boss on the turbine housing;
a cavity radially between the turbine housing and the exhaust case;
a probe extending through the second probe boss, the cavity and the first probe boss; and
a sleeve extending from the first probe boss through the cavity and into the second probe boss, the sleeve circumscribing an annular cavity around the probe, the annular cavity being sealed at opposed radially inner and radially outer ends thereof to form a dead air cavity around the probe, wherein the sleeve has a radially inner end having an inner diameter surface in tight fit engagement with an outer diameter surface of the first probe boss, and wherein the inner diameter surface includes circumferentially spaced-apart tight fit contact surface segments and inter-segment slots providing a discontinuous tight fit interface between the sleeve and the first probe boss.

2. The gas turbine engine hot section according to claim 1, wherein the first probe boss has an outer shoulder extending from the outer diameter surface for sealing engagement with an end face of the radially inner end of the sleeve.

3. The gas turbine engine hot section according to claim 2, wherein the sleeve is biased against the outer shoulder.

4. The gas turbine engine hot section according to claim 1, wherein the sleeve is biased by a compression seal disposed between the sleeve and an outer shoulder projecting from a bolt threadably engaged with the first probe boss.

5. The gas turbine engine hot section according to claim 4, wherein the bolt secures the probe in position on an inner shoulder of the first probe boss.

6. The gas turbine engine hot section according to claim 1, wherein the sleeve has an inner shoulder at a radially outer end thereof, the inner shoulder cooperating with a compression seal to seal the radially outer end of the annular cavity.

7. The gas turbine engine hot section according to claim 6, further comprising a hollow bolt fitted over the probe inside the sleeve, the annular cavity defined between the hollow bolt and the sleeve, the hollow bolt having an outer shoulder, the compression seal compressed between the outer shoulder of the hollow bolt and the inner shoulder of the sleeve.

8. An aircraft power plant comprising:
a nacelle;
a gas turbine engine mounted in the nacelle, the gas turbine engine comprising:
a compressor;
a turbine drivingly connected to the compressor, the turbine housed in a turbine housing extending around a central axis, the turbine housing having a first probe boss;
an exhaust case for discharging combustion gases received from the turbine, the exhaust case surrounding the turbine housing and having a second probe boss aligned with the first probe boss;
a probe extending through the first and second probe bosses and into the turbine housing; and
a sleeve projecting from the first probe boss into the second probe boss, the sleeve circumscribing an annular cavity around the probe, the annular cavity closed at both a radially outer end and a radially inner end thereof, wherein the sleeve has a radially outer end having an annular inner shoulder in sealing engagement with a compression seal, the compression seal sealing the radially outer end and axially loading the sleeve against an annular outer shoulder projecting from the first probe boss.

9. The aircraft power plant according to claim 8, wherein the sleeve has a radially inner end having an interference fit diameter with the first probe boss.

10. The aircraft power plant according to claim 8, wherein the sleeve and the first probe boss have a tight fit interface, and wherein the tight fit interface is circumferentially discontinuous.

11. The aircraft power plant according to claim 10, wherein the tight fit interface comprises circumferentially spaced-apart tight fit contact surface segments extending from an inner diameter surface of the sleeve, the circumferentially spaced-apart tight fit contact surface segments being circumferentially separated by inter-segment slots.

12. The aircraft power plant according to claim 8, wherein the compression seal comprises a C-ring seal seated on the annular inner shoulder of the sleeve.

13. The aircraft power plant according to claim 12, wherein the C-ring seal is compressed by an outer shoulder of a hollow bolt extending over the probe, the hollow bolt threadably engaged with the first probe boss.

14. The aircraft power plant according to claim 13, wherein the annular cavity is defined between the hollow bolt and the sleeve.

15. The aircraft power plant according to claim 14, wherein the hollow bolt has outer threads at a radially inner end thereof for meshing engagement with corresponding inner threads on the first probe boss.

16. A thermal shielding arrangement for a probe extending through an exhaust case and a turbine housing of an aircraft engine, the thermal shielding arrangement comprising: a sleeve having a radially inner end mounted with a tight fit engagement to the turbine housing and a radially outer end floatingly received in a probe boss on the exhaust case, the sleeve circumscribing an annular cavity around the probe, the annular cavity being closed at opposed ends thereof; and a compression seal pressed against an annular inner shoulder projecting from an inner diameter surface at a radially outer end of the sleeve inside the probe boss on the exhaust case.

\* \* \* \* \*